United States Patent [19]

Takeda

[11] Patent Number: 5,594,313
[45] Date of Patent: Jan. 14, 1997

[54] SOLAR CELL SYSTEM

[75] Inventor: Harumi Takeda, Osakasayama, Japan

[73] Assignee: Ueda Co., Ltd., Osaka, Japan

[21] Appl. No.: 489,578

[22] Filed: Jun. 12, 1995

[51] Int. Cl.⁶ .................................................. H02J 15/00
[52] U.S. Cl. .................................................. 320/1; 136/293
[58] Field of Search .................................. 320/1; 136/293

[56] References Cited

U.S. PATENT DOCUMENTS

| | | | |
|---|---|---|---|
| 4,959,603 | 9/1990 | Yamamoto et al. | 320/1 |
| 4,963,811 | 10/1990 | Weber | 320/1 |

FOREIGN PATENT DOCUMENTS

| | | | |
|---|---|---|---|
| 390253A2 | 3/1990 | European Pat. Off. | |
| 4226530 | 2/1994 | Germany | 136/293 |
| 95-166173 | 3/1995 | United Kingdom | |

OTHER PUBLICATIONS

Abstract of Japanese Patent Publ. No. JP63250867 dated Oct. 18, 1988.
Abstract of Japanese Patent Publ. No. JP61070768 dated Apr. 11, 1986.
Abstract of Japanese Patent Publ. No. JP1064371 dated Mar. 10, 1989.
Abstract of Japanese Patent Publ. No. JP205572 dated Aug. 17, 1989.
Abstract of Japanese Patent Publ. No. JP6348211 dated Dec. 22, 1994.

*Primary Examiner*—Aron Weisstuch
*Attorney, Agent, or Firm*—Nikaido Marmelstein Murray & Oram LLP

[57] ABSTRACT

A solar cell system stores electric power generated by solar cells and supplies the electric power to a load. This system includes a solar cell assembly having a capacity for generating electric power in a quantity consumed by the load in one day, the quantity being determined from an estimated quantity of solar radiation available on a rainy or cloudy day, and an electric double layer capacitor having a storage capacity corresponding at least to the quantity consumed by the load in one day.

2 Claims, 3 Drawing Sheets

SOLAR CELL SYSTEM

BACKGROUND OF THE INVENTION (1) Field of the Invention

This invention relates to a solar cell system for storing electric power generated by solar cells, and supplying the power to a load.

(2) Description of the Related Art

A solar cell system used as a power source for an unmanned lighthouse, street light or the like includes a storage battery provided between solar cells and a load. Electric power generated by the solar cells is stored in the storage battery which supplies the load with power in a stable way even on rainy days and at night-time.

The solar cells and storage battery of this solar cell system have capacities determined based on solar radiation data of an installation site. This is because the quantity of solar radiation is variable with the latitude and seasons of the installation site.

The capacities are determined in the following sequence, for example.

Assuming that the load consumes electric power PL per day, output PS of the solar cells (in fine weather) is expressed by the following equation:

$$PS = K \times PL.$$

In the above equation, correction factor K is variable with the installation site or region, and generally is selected from within the range of 1 to 4.

The relationship between the correction factor K and sunlight hours is derived empirically from results of actual operating tests and the like carried out on the most standard, independent power source combining solar cells and the storage battery. Correction factor K embraces variations with temperature changes of solar cell output occurring throughout the year, and correction values for the storage battery efficiency and the like.

Correction factor K is given the following values, for example:

| | |
|---|---|
| sea, road centers, speedways, and poles (high or sunny locations) | 1–2 |
| buildings and other such structures | 2–3 |
| roadsides, grounds, and curbstones | 3–4 |

The capacity of solar cells for providing a current needed to charge the storage battery is determined from solar cell output PS derived as above.

The storage battery combined with the solar cells is required to meet the following conditions:
(1) small self-discharge;
(2) easy maintenance;
(3) long life;
(4) low price;
(5) large capacity per unit volume; and
(6) efficient charging and discharging.

Thus, the storage battery usually comprises a lead-acid battery which is inexpensive and provides an economic advantage, or a nickel-cadmium battery (so-called Ni-Cd battery) which has a long cycle life.

Capacity PB of the storage battery is determined from various conditions, such as a possible spell of sunless weather, and the number of days the system is desired to rely solely on the storage battery. Generally, capacity PB is determined to cover 5 to 30 days of power consumption PL by the load.

That is, battery capacity PB=5 to 30×PL.

With the conventional solar cell system, the solar cells and storage battery have large capacities to secure sufficient margins since the intensity of sunlight irradiating the solar cells is not constant but widely variable.

However, the conventional solar cell system is designed on the assumption that the solar cells must be installed in a sunny location (facing south), and not in the shade, to receive solar radiation in fine weather. This aspect has been an obstacle to widespread use of the solar cell system.

Further, as noted above, the solar cells and storage battery have large capacities determined to have sufficient margins. This results in a large construction and high cost, which again, obstructs widespread use of the solar cell system.

The storage battery (secondary battery) used in the solar cell system has a short charge/discharge cycle life of approximately 200–500 times, and must normally be changed every two or three years. Besides, a lead-acid battery requires periodic inspections such as replenishment and specific gravity measurement of the electrolyte, and hence its maintenance is troublesome. As a result, the system involves high maintenance and other costs.

Furthermore, the secondary battery includes heavy metals such as lead or cadmium. Disposal of the secondary battery leads to a secondary pollution, and therefore a necessity of its collection arises.

The secondary battery has a narrow use temperature range of 0° to 45° C. This is detrimental for using the system in a cold climate.

SUMMARY OF THE INVENTION

This invention has been made with regard to the state of the art noted above, and its object is to provide a convenient solar cell system which is small, long-lasting, safe, pollution-free, and usable in a cold climate, which realizes low cost, and which is usable even in the shade to allow a high degree of freedom for selecting an installation site.

The above object is fulfilled, according to this invention, by a solar cell system for storing electric power generated by solar cells and supplying the power to a load, the system comprising:

a solar cell assembly having a capacity for generating electric power in a quantity consumed by the load in one day, the quantity being determined from an estimated quantity of solar radiation available on a rainy or cloudy day; and an electric double layer capacitor having a storage capacity corresponding at least to the quantity consumed by the load in one day.

In the above solar cell system, the solar cell assembly has an increased output capacity to generate electric power in the shade on a rainy or cloudy day. As a result, the double layer capacitor can be charged, during the daytime, with power to be consumed by the load for the day.

The double layer capacitor is charged by the solar cell assembly during the daytime, and supplies power to the load during the night when there is no solar radiation. Thus, the double layer capacitor undergoes thorough charging and discharging. However, this double layer capacitor, with no chemical reaction involved, can repeat such charging and discharging over 100,000 times, and withstand long-term use. The double layer capacitor has a structure including activated carbon and an organic solvent having a different phase contact therebetween. Electric charges (ions) accumulate therein merely through adsorption/desorption. There is no limitation to charging and discharging, from minute electric current to large electric current. Consequently, the double layer capacitor may be charged with a large current in fine weather, direct exposure conditions, and with a minute current in rainy or shaded conditions. The double layer capacitor may be charged with necessary power during the daytime, regardless of installation and weather conditions, whether the solar cell assembly is in the shade, and whether the weather is fine or rainy.

Further, the electric double layer capacitor is characterized by a wide use temperature range of −40° to 75° C., and by its structure which includes no heavy metals. These features enable the system to be used in a cold climate, and without causing pollution when the capacitor is discarded. Thus, this invention solves the problems of the conventional solar cell system.

In a preferred embodiment of the invention, the electric double layer capacitor is formed as an electric double layer capacitor unit including a plurality of capacitors manually or automatically switchable from parallel connection to series connection based on determination of the voltage charged and the solar radiation.

The output capacity of the solar cell assembly is determined based on the worst weather conditions such as winter, northward facing direction, installation in the shade, rainy weather, and so on. In addition, the plurality of capacitors are switched from parallel connection to series connection in the event of a charge shortage due to an abnormal weather condition (e.g. solar eclipse) which can be hard to predict. This switching provides an increased voltage and enables effective use of residual energy to cater for one day's power consumption.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DESCRIPTION OF THE PREFERRED EMBODIMENTS

Preferred embodiments of this invention will be described in detail hereinafter with reference to the drawings.

First Embodiment

Figure 1:
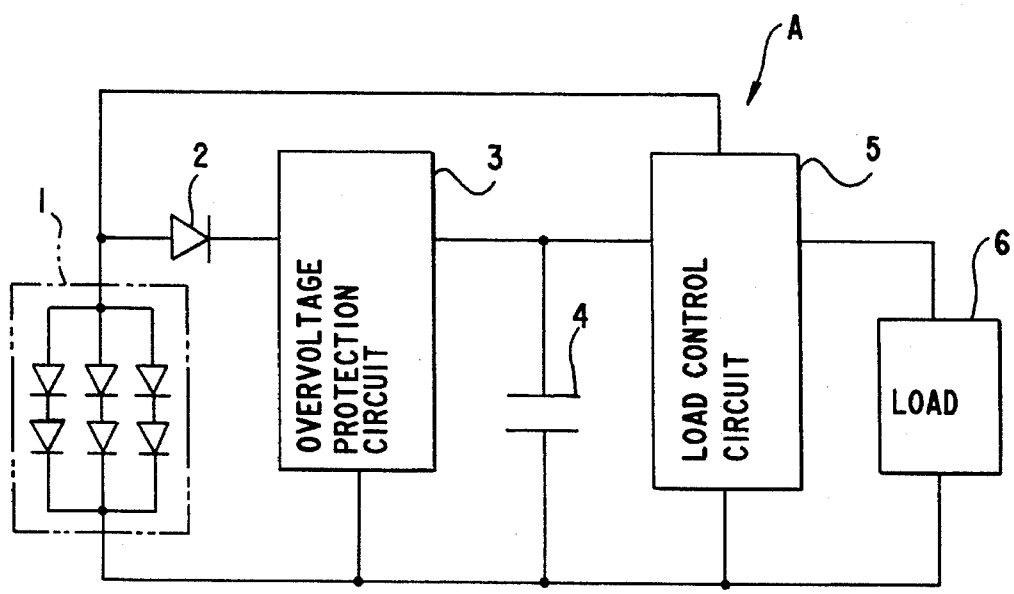
FIG. 1 is a block diagram of a solar cell system in a first embodiment of this invention.

FIG. 1 is a block diagram of a solar cell system in a first embodiment of this invention.

As shown in FIG. 1, this solar cell system A has an electric double layer capacitor 4 disposed between a solar cell assembly 1 and a load 6. The solar cell assembly 1 includes a plurality of solar cell modules in series/parallel connection. The solar cell assembly 1 is designed to cope with small quantities of solar radiation in the shade, in rainy or cloudy weather during the daytime. Thus, even in such conditions, the double layer capacitor 4 is charged with electric power to be used by the load 6 for the day.

Consequently, a very large quantity of charging current is generated when the solar cell assembly 1 is installed on a site facing south and the weather is fine, thereby to be exposed to strong solar radiation. The double layer capacitor 4 may be charged with a large quantity of current in a short time with no problem. Therefore, no special current limiting circuit is required, but a reverse flow preventive diode 2 is adequate.

The double layer capacitor 4 has a capacity PB for storing at least the amount of electric power consumed by the load 6 in one day. Thus, capacity PB of the double layer capacitor 4 provides a margin ⅕ to ¹⁄₃₀ of a storage battery used in the conventional solar cell system. The double layer capacitor 4 is much smaller and lighter than the conventional storage battery.

The basic principle of computing capacity PS of the solar cell assembly 1 and capacity PB of the double layer capacitor 4 in the solar cell system A of this embodiment will be described next.

First, power consumption per day PL(day) of load 6 is determined.

PL(day)=load current X rated voltage X accumulated daily operating time (seconds).

Next, values of capacity PB and capacitance C (in Farads, F) of the double layer capacitor 4 are derived from PL(day):W.seconds determined as above.

Generally, a capacitor stores energy $½·CV^2$(W.sec.), where the voltage used is V1 to V2;

PL(day)=PB=$½·C (V1^2−V2^2)$ (W.sec.)

That is, C=$(2×PL(day))/(V1^2−V2^2)$.

Then, capacity PS of the solar cell assembly 1 for charging the double layer capacitor 4 is determined.

Generally, charging current I for charging the double layer capacitor 4 is based on C.V=I.T;

I=C(V1−V2)/T(sec.)

When, for example, the double layer capacitor 4 is charged by solar radiation for H hours;

I=C(V1−V2)/(60 (sec.)×60 (min.)×H (hr.))

Here, charging current I is set so that the double layer capacitor 4 may be charged in the shade and in rainy or cloudy weather. Then;

Capacity PS of solar cell assembly 1=rated voltage X I.

Generally, solar cell output is widely variable with climate, weather, and installation site.

Assuming, for example, the output to be 100% in direct exposure condition in fine weather, then;

| In the shade: | 30% |
| In the shade in cloudy weather: | 10% |
| In the shade in rainy weather: | 3%. |

Consequently, when the solar cell assembly is used with no regard to the climate or installation site, only 3% of its rated output is made available. However, it is unnecessary to provide a capacity for compensating for 5 to 30 sunless days as in the conventional storage battery system. It is adequate for the double layer capacitor to have a small storage capacity for covering one day. Thus, a small solar cell output is adequate to charge the double layer capacitor.

Numeral 3 in FIG. 1 denotes an overvoltage protection circuit. When the output voltage of solar cell assembly 1 reaches the overcharge voltage of the double layer capacitor 4, the protection circuit 3 shuts off the output of solar cell assembly 1 to protect the double layer capacitor 4.

Numeral 5 in FIG. 1 denotes a load control circuit for controlling the power supply to the load 6. The load control circuit 5 has the functions of controlling supplying time and to operate intermittently. For example, the control circuit 5 detects the output voltage of solar cell assembly 1, and supplies power to the load 6 when the detection value falls below a predetermined value after sunset.

Second Embodiment

Figure 2:
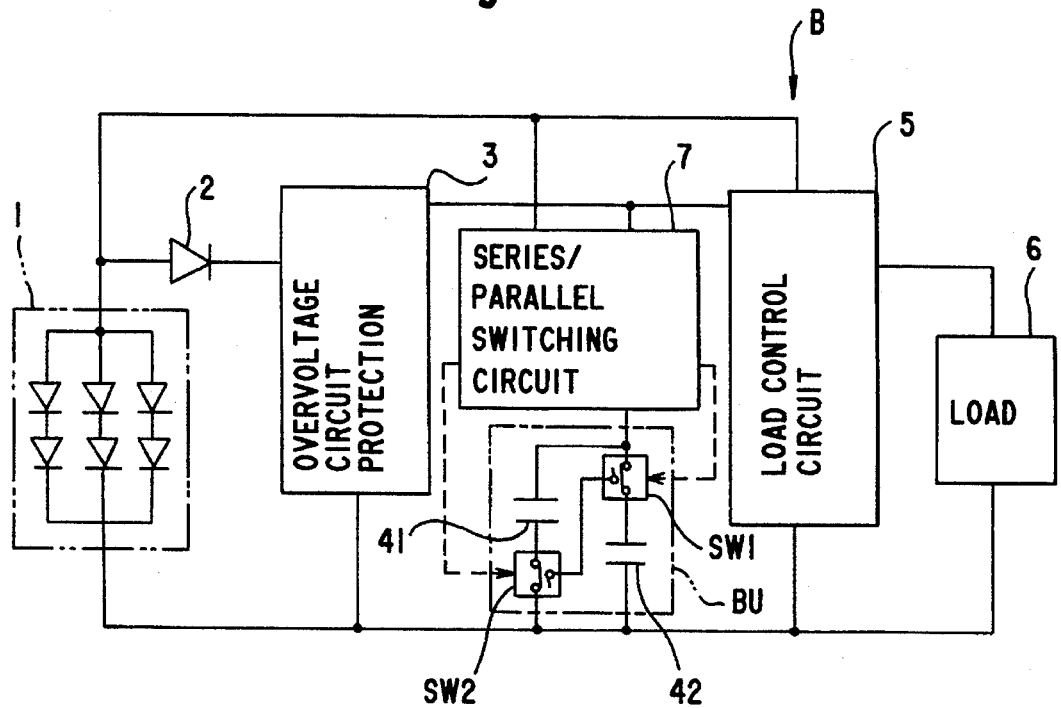
FIG. 2 is a block diagram of a solar cell system in a second embodiment of this invention.

A second embodiment will be described next with reference to FIG. 2. FIG. 2 is a block diagram of a solar cell system B. In FIG. 2, like reference numerals are used to identify like parts in the first embodiment and will not be described again. This system has the same basic operation as the solar cell system A shown in FIG. 1. As distinct from the first embodiment, the second embodiment includes a plurality of electric double layer capacitors manually or automatically switchable from parallel connection to series connection.

Reference BU in FIG. 2 denotes an electric double layer capacitor unit. This electric double layer capacitor unit BU includes two electric double layer capacitors 41 and 42. The two double layer capacitors 41 and 42 are switchable by changeover switches SW1 and SW2 between parallel connection (shown in solid lines) and series connection (shown in dotted lines). The double layer capacitor unit BU is in parallel connection (as shown in FIG. 2) in a normal condition (during charging). The changeover switches SW1 and SW2 are operable both manually and automatically. The number of double layer capacitors is not limited to two, but may be determined by taking the rating of the load 6 into account.

The switchable double layer capacitors 41 and 42 are provided in order to ensure power supply for one day if a rare charging shortage should occur during an unpredictable abnormal weather condition (e.g. a solar eclipse). A system design fully anticipating abnormal weather conditions would require an excessively large solar cell assembly. Such a system that copes with an event taking place once a year, if at all, is uneconomical and unacceptable.

When the quantity of solar radiation falls below an acceptable minimum in such a weather condition, an intended power supply is impossible because of a charging shortage. On such an occasion, a series/parallel switching circuit 7 is operable manually or automatically based on a determination of solar radiation or charging voltage, to switch the double layer capacitors 41 and 42 from parallel connection to series connection. As a result, an increased voltage is supplied to the load 6 to enable power consumption for the day.

If, for example, each of the double layer capacitors 41 and 42 has a rating of 2.5V and 10F, and uses 2.5V to 2V, the energy ($\frac{1}{2}C(V1^2-V2^2)$) in "parallel connection state" when charged by a quantity of solar radiation exceeding the acceptable minimum (normal charging) is expressed by the following equation:

$$1/2 \cdot 20 \cdot (2.5^2 - 2^2) = 22.5 \text{ (W.sec.)}$$

In the event of a charge shortage due to an abnormal weather condition as noted above, with each double layer capacitor 41 or 42 becoming "2.0V" and 10F (abnormal charging), using 4.0V to 2.0V in "series connection state", the energy is expressed by the following equation:

$$1/2 \cdot 5 \cdot (4^2 - 2^2) = 30 \text{ (W.sec.)}$$

which meets the power consumption requirement for the day.

Thus, power consumed by the load 6 for the day may be supplied by switching the connection from parallel to series. That is, the solar cell system B is operable in a normal way even in the event of a charge shortage due to a rare abnormal weather condition.

The solar cell systems A and B are constructed as described above. The solar cell assembly 1 having an increased capacity is capable, with generation occurring during the day, even though installed in the shade, and regardless of rainy or cloudy weather, of charging the double layer capacitor 4 (or capacitors 41 and 42) with electric power consumed by the load for the day. The solar cell assembly 1 is exposed to solar radiation, the quantity of which is not constant but widely variable from sunrise to sunset. That is, the double layer capacitor 4 (or capacitors 41 and 42) supplies power to the load 6 in the morning and evening when the quantity of solar radiation is small and at night when there is no solar radiation.

During the day when the quantity of solar radiation is large, the double layer capacitor 4 (or capacitors 41 and 42) is charged by the solar cell assembly 1 to store power consumed by the load 6 for the day. The double layer capacitor 4 (or capacitors 41 and 42) has a small capacity PB which is just enough for supplying power to the load 6 to be consumed for the day. Thus, double layer capacitor 4 (or capacitors 41 and 42) repeats charging and discharging approximate to a complete discharge.

When a storage battery is used in this way, the battery usually deteriorates after repeating charging and discharging 200 to 500 times. It is necessary to change the battery every two or three years. However, the double layer capacitor 4 (or capacitors 41 and 42), with no chemical reaction accompanying its charging and discharging, can undergo charging and discharging over 100,000 times with no problem. Thus, the double layer capacitor 4 (or capacitors 41 and 42) need not be changed for a long period of time, and requires no maintenance, thereby achieving low cost.

In the solar cell systems A and B according to this invention, the capacity PB of the double layer capacitor 4 (or capacitors 41 and 42) may just cover one days power consumption requirement. In the conventional solar cell system, the storage battery needs to cover 5 to 30 days of consumption by the load. The capacity ratio of the double layer capacitor 4 (or capacitors 41 and 42) to the storage battery is $\frac{1}{5}$ to $\frac{1}{30}$. The solar cell systems A and B according to this invention occupy a reduced installation space, and involve a reduced number of capacitors to be discarded, thereby contributing toward resources saving.

The double layer capacitor 4 (or capacitors 41 and 42) is formed of activated carbon and an organic solvent, thus causing no heavy metal pollution when discarded.

Further, the double layer capacitor 4 (or capacitors 41 and 42) has a wide range of use temperature from −40° to 75° C. This enables the systems to be used in a cold climate.

Figure 3:
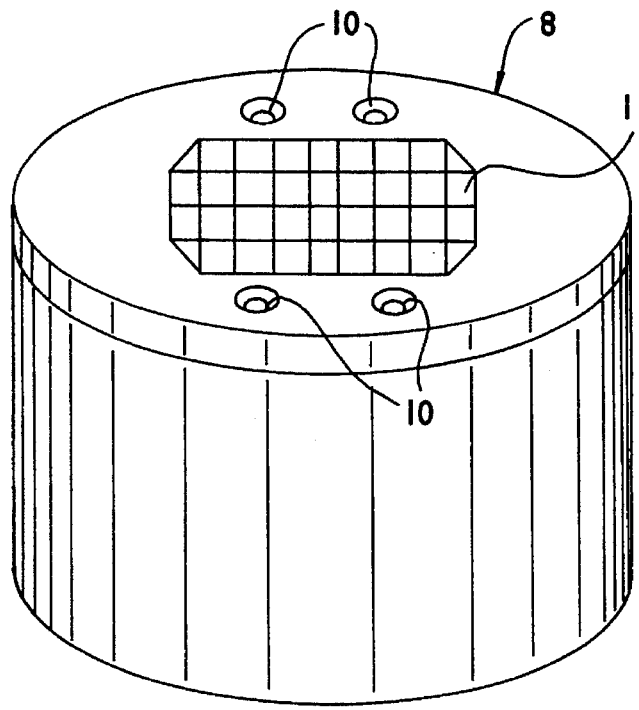
FIG. 3 is a perspective view of a road safety beacon used in a comparison between the prior art and this invention.
Figure 4:
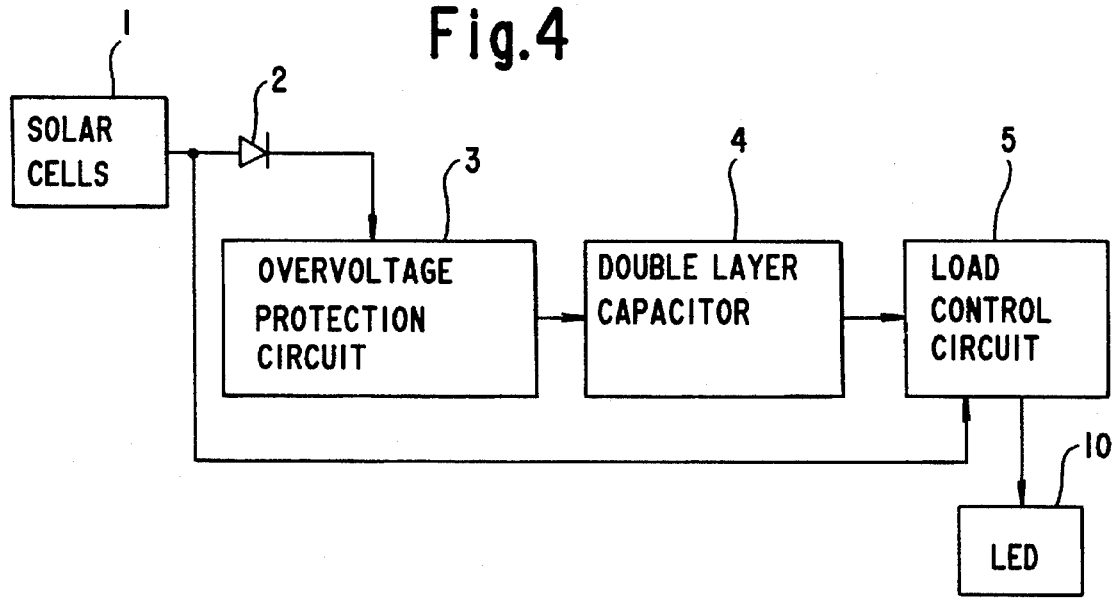
FIG. 4 is a block diagram of the road safety beacon.

FIG. 3 shows a road safety beacon 8 to which this invention is applied. As shown in FIG. 4, this beacon 8 includes the double layer capacitor 4 disposed between the solar cell assembly 1 and a load (light emitting diodes) 10. A similar beacon has been manufactured, using a conventional secondary battery (not shown). The following is a table of comparison between the two types of beacons with respect to storage capacity PB, solar cell capacity PS, and other parameters. In the test, the power consumed by the road safety beacon or load L in one day is set to PL(day)=1 (W.h).

| comparison item | prior art | invention |
|---|---|---|
| storage capacity PB | 5–30 (W · h) Ni—Cd or lead - acid bat. | 1 (W · h) double layer cap. |
| solar cell output PS | 1 to 4 (W) | 0.1 to 0.125 (W) PS = PL/8 to 10h output in fine weather about 3(W) |
| use temp. range | 0 to 45° C. | −40 to 75° C. |
| install. conditions | fine weather sunny south side | free shade and rainy acceptable |
| life | 2 to 3 years | 15 years or more |
| others | | |
| periodic inspection | necessary | unnecessary |
| maintenance | necessary | unnecessary |
| pollution | subject to regulation | pollution-free |

As seen from the above results, the solar cell system A or B employing the double layer capacitor 4 (or capacitors 41 and 42) according to this invention has advantages in size, weight, use temperature range, life, cost, etc. over the conventional solar cell system employing an Ni-Cd battery or lead-acid storage battery.

Figure 5:
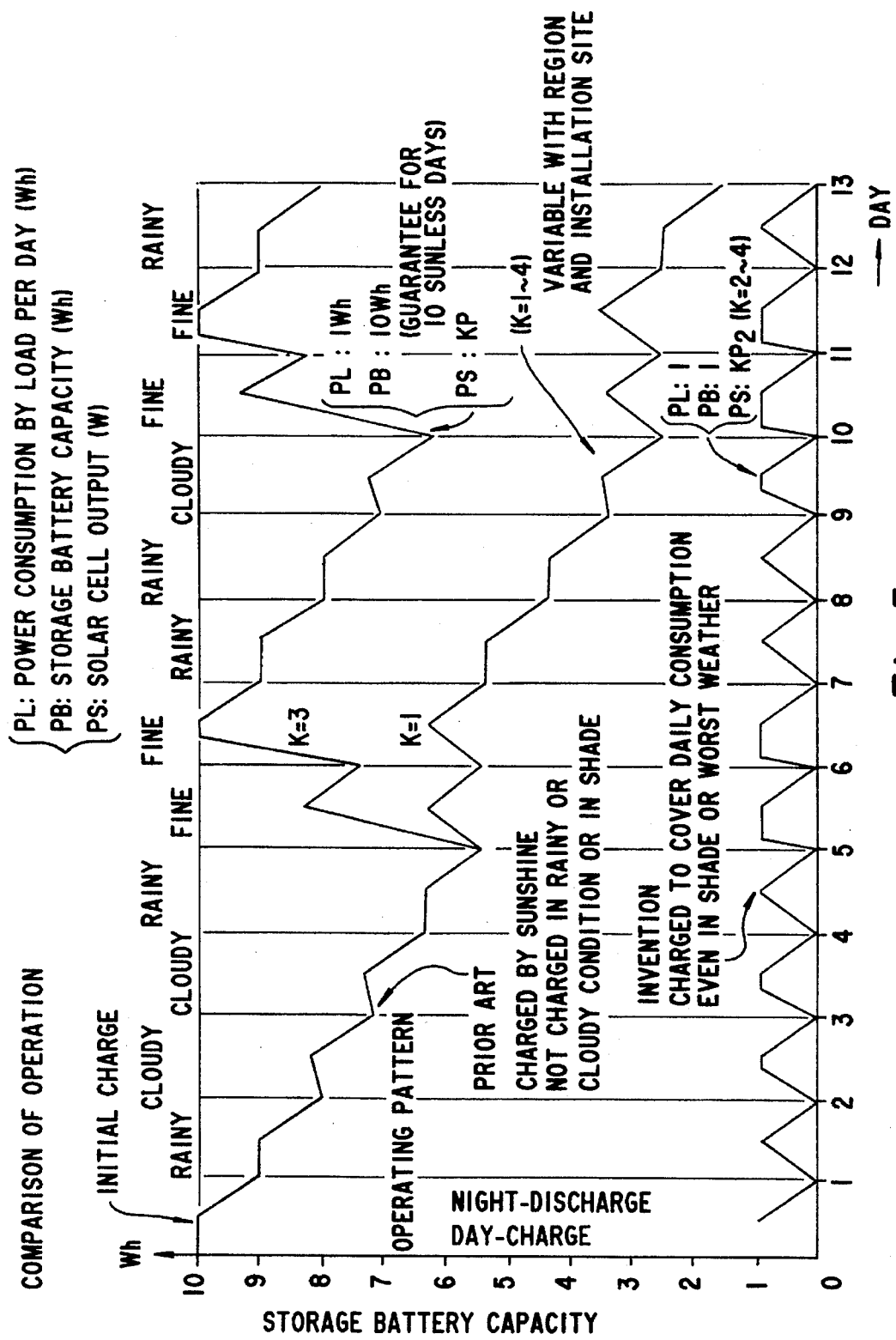
FIG. 5 is a view for comparing operations of a conventional road safety beacon and a road safety beacon according to this invention.

FIG. 5 shows a comparison of operation between the two systems. As seen, the conventional system requires a large storage capacity since sufficient electricity is not generated in rainy or cloudy weather or in the shade. In the system according to this invention, solar cell capacity PS is determined to ensure sufficient power generation even in rainy or cloudy weather or in the shade. In addition, the invention employs the repeatedly chargeable and dischargeable, electric double layer capacitor 4 as a storage battery, to realize the above advantages.

The present invention may be embodied in other specific forms without departing from the spirit or essential attributes thereof and, accordingly, reference should be made to the appended claims, rather than to the foregoing specification, as indicating the scope of the invention.

What is claimed is:

1. A solar cell system for storing electric power generated by solar cells and supplying the electric power to a load, said system comprising:

a solar cell assembly having a capacity for generating electric power in a quantity consumed by said load in one day, said quantity being determined form an estimated quantity of solar radiation available on a rainy or cloudy day;

electric double layer capacitor means for storing the electric power generated by said solar cell assembly, said electric double layer capacitor means having a storage capacity corresponding at least to said quantity consumed by said load in one day; and an overvoltage protection circuit, interposed between said solar cell assembly and said electric double layer capacitor means, for shutting off output of said solar cell assembly when an output voltage of said solar cell assembly reaches an overcharge voltage of said double layer capacitor means.

2. A system as defined in claim 1, wherein said electric double layer capacitor means is formed as an electric double layer capacitor unit including a plurality of capacitors manually or automatically switchable from parallel connection to series connection based on determination of the voltage charged and the solar radiation.

\* \* \* \* \*